United States Patent [19]

West

[11] Patent Number: 4,628,184

[45] Date of Patent: Dec. 9, 1986

[54] FOAM INSULATED WATER HEATER AND METHOD OF MAKING SAME

[75] Inventor: Eugene L. West, Grand Rapids, Mich.

[73] Assignee: Bradford-White Corporation, Philadelphia, Pa.

[21] Appl. No.: 716,024

[22] Filed: Mar. 26, 1985

[51] Int. Cl.⁴ ............................................. F24H 1/18
[52] U.S. Cl. .................................. 219/312; 264/46.9; 264/46.7; 264/46.5
[58] Field of Search ........................ 219/312; 126/375; 264/46.9, 46.7, 46.5

[56] References Cited

U.S. PATENT DOCUMENTS

| 4,372,028 | 2/1983 | Clark et al. | 126/375 |
| 4,447,377 | 5/1984 | Denton | 126/375 |
| 4,477,399 | 9/1984 | Tilton | 264/46.9 |

FOREIGN PATENT DOCUMENTS 0203337 11/1983 Japan .................................. 126/375

Primary Examiner—Nicholas P. Godici
Assistant Examiner—Karen Skillman
Attorney, Agent, or Firm—Austin R. Miller

[57] ABSTRACT

A water heater comprising a water tank having a component intended to be kept substantially free from contact with an expandable foam insulating material, and a method of making same, is provided. The water heater has a jacket surrounding the tank and providing an insulating space therebetween. Positioned within this space is a pair of flexible sheets forming an apron. The sheets are joined to form a seal protecting the component from contact with the foam. The apron is positioned over a part of the tank surface so that the seal surrounds the component. The sheets of the apron are substantially unsealed along their top and sides. Foam is introduced between the sheets of the apron and flows out of the unsealed sides of the apron to fill the space between the tank and the jacket.

20 Claims, 3 Drawing Figures

FOAM INSULATED WATER HEATER AND METHOD OF MAKING SAME

BACKGROUND OF THE INVENTION

1. Field of the Invention

The present invention relates to foam insulated water heaters and methods of making same. More particularly, the present invention relates to a method of insulating a water heater tank with an expandable foam insulation material such as polyurethane foam.

2. Description of the Prior Art

The advantage of using rigid polyurethane foam insulation in water heater construction has been recognized for several years. For example, the heat conductivity of polyurethane foam is lower than that of fiberglass, thereby providing superior insulation properties. Thus, it is possible to obtain the same insulation properties utilizing a substantially reduced insulation wall thickness, as compared to conventional insulation materials, such as fiberglass. This results in water heaters having a reduced size thereby providing lower packaging and shipping costs.

In addition, the rigidity of the foam insulation, when compared with that of fiberglass, provides improved resistance to dents in the exterior jacket of the tank. This factor permits the use of less sophisticated (and therefore less expensive) shipping containers.

Although the superior insulating properties of expandable foam materials such as polyurethane have been well recognized for many years, the use of foam as an insulating material in water heaters has been to date quite limited. This is due at least in part to the production problems encountered using expandable foam materials. One of the major problems associated with water heater manufacturing, and particularly the production of foam insulated water heaters, has been the method by which the foam insulation layer is formed about the tank. Generally, the foam is injected as a liquid which continually expands and eventually sets into a rigid foam layer. Usually the liquid foam is injected into the annular space between the inner tank and the outer jacket. Unfortunately, the liquid foam has a tendency to leak out of any small openings in the seams of the outer jacket. In addition, the sides of the tank generally are provided with openings such as a drain opening or with valves such as a temperature and pressure release valve. Also attached to the sides of the tank are electric controls and other components such as thermostats. In the past, it has been a serious problem in preventing these openings and components from becoming covered with foam, interfering with subsequent servicing, repair, adjustment, etc.

One way of shielding these areas from the expanding foam has been to pack the regions surrounding the nipples and controls with fiberglass insulation material. The fiberglass insulation material then serves as a "foam dam" during the foaming operation.

Other processes utilize a plastic bag filled with the expanding foam material, the bag being positioned around the tank. In U.S. Pat. No. 4,372,028 the liquid foam material is first injected into a bag. The bag is then sealed and positioned circumferentially or longitudinally about the tank. The bag may have welded cut out openings which fit over any components attached to the exterior wall of the tank. Because the foam is wholly contained within an enclosed plastic bag, there is no danger of the foam leaking into unwanted areas. Once the foam within the bag expands sufficiently, it forms an effective dam about the electrical control or other area. Subsequently, the remaining annular space between the tank and the outer jacket may be foamed without danger of the foam leaking into the components.

U.S. Pat. No. 4,447,377 utilizes another type of plastic bag used in foam insulated water heaters. The bag has a shape which may extend substantially around the entire circumference of the tank. The bag is first positioned around the tank and then the outer jacket is positioned around the bag. Cut out weld holes may be provided in the bag and positioned about any components such as electrical controls, thermostats, drain lines, etc. The top pan is then positioned over the jacket and foam is injected (through an opening in the top pan) into the bag. Since the expanding foam is wholly contained within the bag, there is no danger of unwanted foam leakage.

It has now been discovered that remarkable advantages are achieved by letting the expanding foam material flow freely, without containing it within a bag. It has now been discovered that the expanding foam material gains viscosity and volume as it is being formed and that a surprisingly improved product is obtained by controlling the flow only when the foam is in its most liquid state. Thus, it is an object of the present invention to provide a method of injecting foam insulation into the annular space between a hot water tank and the outer jacket wherein the injected foam is controlled only at the very initial stage of this injection, and is later allowed to freely expand within the annular space.

SUMMARY OF THE INVENTION

These and other objects of the present invention are met by a water heater including a tank and an outer jacket surrounding the tank and spaced therefrom in order to provide an annular space therebetween, wherein a foam insulating material is provided in the annular space, and wherein the foam insulating material is formed by injecting an expandable foam, such as liquid polyurethane foam, into a plastic apron member having open sides. The plastic apron is typically provided with welded dam portions positioned to protect components attached to the exterior wall of the tank, such as electrical controls, thermostats, drain pipes, etc.

Figure 1:
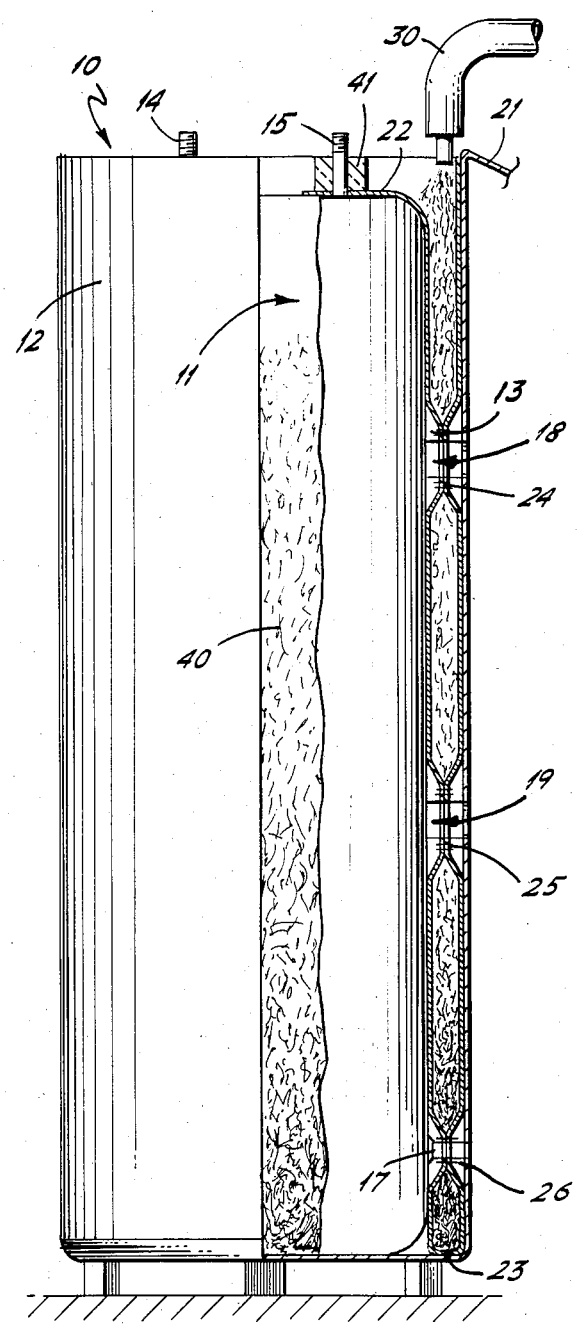
FIG. 1 is a side elevational view, shown partly in section, of a water heater including a water tank and an outer jacket with an apron during a preferred form of foam injection step in accordance with this invention.

Although specific forms of apparatus embodying the invention have been selected for illustration in the drawings, and although specific terminology will be resorted to in describing those forms in the specfication which follows, their use in not intended to define or limit the scope of the invention which is defined in the appended claims. Although an electric type of water heater has been selected for illustration as a matter of convenience, the invention applies as well to gas heaters or any others.

DESCRIPTION OF THE PREFERRED EMBODIMENTS

Referring to the drawings wherein like reference numerals refer to the same features in the several drawings, and especially referring to FIG. 1, there is shown electric water heater 10. Water heater 10 consists of a water tank 11 having a cold water inlet nipple 14 and a hot water outlet nipple 15. Nipples 14, 15 are each surrounded with a block 41 of fiberglass or other insulating material in order to effectively prevent the injected foam from leaking through the openings (provided for the nipples 14, 15) in the top of the water heater. Surrounding tank 11 is outer jacket 12, typically constructed of sheet metal. The diameter of jacket 12 is greater than the diameter of tank 11, thereby creating an annular insulating space 13 therebetween.

Electric water heater 10 is provided with a number of components on the exterior wall of the tank 11. For instance, near the bottom of the tank 11 there is provided a drain opening 17. In addition, components 16a, 16b are attached to the side wall of tank 11 at areas 18, 19, respectively. Components 16a, 16b appear in FIG. 2 but have been deleted from FIG. 1 for ease of illustration. Typically, components 16a, 16b comprise electrical control components such as thermostats or similar devices. However, other types of components may also be positioned on the outer wall of tank 11, such as temperature and pressure release valves or other types of electrical control equipment.

It is important for purposes of proper operation or maintenance of components 16a, 16b that they be effectively shielded from the injected foam insulation material 40. Apron 20 comprises a pair of flexible sheets 21, 22 covering only a limited area of the tank 11 at the foam injection site. Flexible sheets 21, 22 are preferably composed of a flexible, water-tight material which serves to contain and distribute liquid foam 40. Typically, apron 20 is composed of a plastic sheet such as polyethylene.

Apron 20 has a length which is somewhat longer than the height of tank 11, but is much narrower than the circumference of tank 11. Furthermore, apron 20 is open to permit expanding foam to flow circumferentially without confinement by the apron 20. In the particular embodiment of apron 20 illustrated in FIG. 2 (with the outer jacket 12 removed for ease of illustration) the apron 20 has a width equal to about one-half the circumference of tank 11. However, in many cases the width of the apron 20 may be substantially less than that shown in FIG. 2. In certain cases, the width of the apron 20 may be even less than 25% of the circumference of the tank 11.

Apron 20 is provided with a number of cut out openings 24, 25, 26 defined by weld lines, along which weld lines the flexible sheets 21, 22 are welded together. The positions of openings 24, 25 and 26 correspond to the positions of components 16a, 16b and drain opening 17, respectively.

In the manufacture of the foam insulated water heater 10, apron 20 is appropriately positioned on tank 11 so that components 16a, 16b and drain opening 17 are positioned within the cut out openings 24, 25, 26, respectively. Once the apron 20 has been appropriately positioned, the inner flexible sheet 22 is pressed over hot water outlet nipple 15 so that the apron 20 securely hangs on tank 11. Appropriate openings or slits in flexible sheet 22 may be provided in order to facilitate the hanging of the apron 20 on nipple 15.

As a further step, outer jacket 12 is placed over apron 20 and tank 11. Once the outer jacket 12 is secured, the upper end of flexible sheet 21 is pulled outwardly over the top edge of jacket 12.

An expandable foam insulation material 40 is injected into the space between the tank and the jacket, under control of the apron 20. This is accomplished by introducing the liquid foam components through an injection nozzle 30 which extends into the apron 20. The amount of expandable liqud foam material injected may be predetermined depending upon the size of the cavity 13, the type and amount of foam, etc.

It will be appreciated that wide varieties of foams may be utilized in the practice of this invention. Self-foaming materials may be used, in which the foaming process occurs from chemical reactions brought about by merely mixing the foam producing components with each other. In other forms the foam is created by high pressure gas injection, or other means. In any event, the foaming material tends to be highly flowable and of relatively low viscosity during the initial stages of its formation and to become less flowable and of higher viscosity as the reactions proceed, ultimately setting up completely as a solid and rigid foam block.

The liquid foam 40 is injected, at an early stage of the foam-forming process and is freely flowable. Accordingly, it initially flows downwardly and outwardly to the bottom portion of apron 20. In the embodiment shown in FIG. 2, the bottom edges of flexible sheets 21, 22 are joined along seam 23, typically a heat welded seam. However, it is within the scope of the present invention to utilize a single flexible sheet which is simply folded at the bottom at 23, or to use a pair of flexible sheets which are not joined along their bottom edges.

Figure 2:
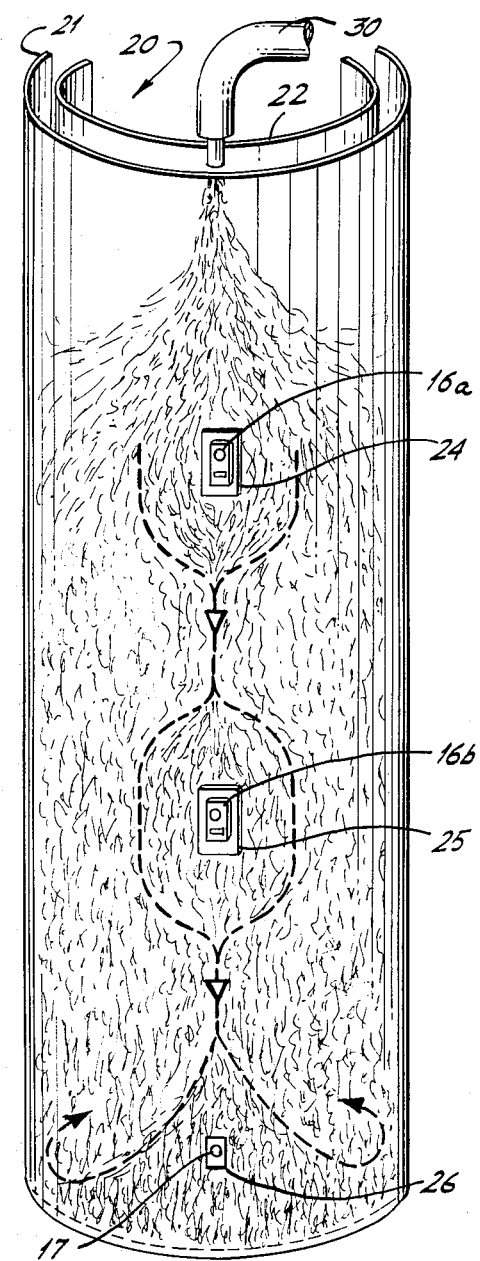
FIG. 2 is a side elevational view of a water tank with an apron, with the outer jacket removed, during the foam injection step of FIG. 1.

As is clearly shown in FIG. 2, the side edges of flexible sheets 21, 22 are not sealed together. However in other embodiments, the sides of the flexible sheets may be joined for a short distance (about 6") adjacent their bottom edges. In either case, the side edges of sheets 21, 22 remain substantially unsealed. Thus, as the foam 40 is injected into apron 20 it is not confined by the apron 20 but is directed by the apron 20 to flow in a circumferential direction as the foam is generated. As more foam 40 is injected into apron 20, and as it begins to expand and to increase in viscosity, the foam 40 is forced out through the open sides of apron 20. However, by the time the foam 40 begins to flow out of the apron 20, it has already increased in viscosity and begun to set and is too thick to present a danger of substantial leakage through small cracks or openings in the outer jacket 12. Furthermore, because of the cut out seams 24, 25 and 26, the liquid foam 40 is effectively dammed from the areas containing components 16a, 16b and drain opening 17.

Figure 3:
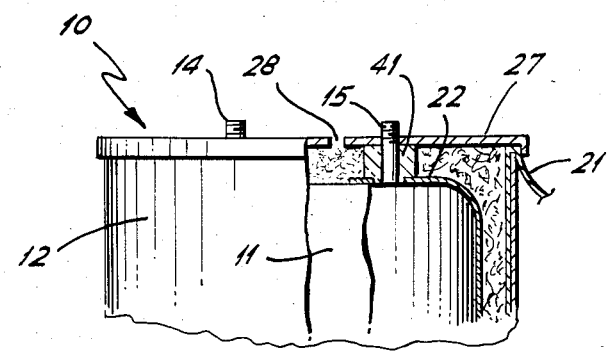
FIG. 3 is a side elevational view, shown partly in section, of a top portion of the heater shown in FIG. 1 with a top cover secured in place.

After the foam 40 has been injected, there is a period of approximately 1 to 5 minutes required for the foam 40 to expand to occupy the entire volume 13 surrounding tank 11 and to set. Thus, after injecting foam 40 through nozzle 30, the top cover 27, shown in FIG. 3, is placed over outer jacket 12. The top cover 27 has appropriate openings for nipples 14, 15. Furthermore, the top cover also is provided with a hole 28 therein to allow air or gases to escape from cavity 13 as the foam expands.

It has been found that with delicate timing the apron 20 provides a unique means of guiding the foam 40 circumferentially during its initial formation, while it is freely flowable, and that apron 20 delays the flow of foam long enough to permit it to experience an increase of viscosity before it flows circumferentially beyond the open edges of the apron 20. In addition, the highly liquid foam 40 is prevented from contaminating the areas containing components 16a, 16b and drain opening 17. The apron 20 also provides an effective means of guiding the foam 40 in its most liquid stage, thereby preventing leakage of foam through the seams and joints of the outer jacket 12. In addition, all of these advantages are provided through only the temporary guiding of the foam 40 within the open apron 20. This provides significant advantages of uniform coverage, ease of application and insulating effectiveness over the enclosed bags and envelopes of the prior art which were undesirable from production, efficiency, and cost standpoints.

Once the foam 40 has been injected and the top cover 27 has been secured to the jacket 11, the foam 40 is allowed to expand and set. As mentioned before, this procedure typically takes several minutes. The progress of the expansion of the foam 40 may be determined by providing a suitable hole in the top cover 27. This hole 28 also provides a suitable escape outlet for gases displaced by the expanding foam 40. Once the foam 40 has expanded to fill the entire space 13 surrounding the tank 11, the hole 28 may be plugged in a known manner.

Alternatively, the top cover 27 may be installed on the outer jacket 12 before the foaming step. In such a case, the foam 40 is injected through a suitable hole provided in the top cover. Likewise, in this alternative procedure, the expansion of the foam 40 may be observed through the hole in the top cover which is later plugged at a suitable time.

Although this invention has been described in the specification with reference to specific forms thereof, it will be appreciated that a wide variety of equivalents may be substituted all without departing from the spirit and scope of the invention as defined in the appended claims.

I claim:

1. In a water heater comprising a water tank having a component intended to be kept substantially free from contact with an expandable foam insulating material and a jacket surrounding the tank and providing an insulating space therebetween, a pair of flexible sheets forming an apron, the sheets being joined to form a seal protecting said component from contact with the foam, the apron being positioned over a part of the tank surface in a position whereby the seal surrounds said component, the apron being substantially unsealed along its top and sides wherein the foam introduced between the sheets flows out of the unsealed sides of the apron to fill said space.

2. The water heater according to claim 1, wherein the apron is composed of plastic.

3. The water heater according to claim 1, wherein the foam comprises polyurethane.

4. The water heater according to claim 1, wherein the component is a thermostat.

5. The water heater according to claim 1, wherein the heater is an electric water heater.

6. The water heater according to claim 1, wherein the sheets are joined along their bottom edges.

7. The water heater according to claim 1, wherein the pair of sheets comprises two portions of a single sheet.

8. The water heater according to claim 1, wherein the component comprises a drain opening.

9. The water heater according to claim 1, wherein the seal defines a closed shape which is cut out from the sheets.

10. The water heater according to claim 1, wherein the component is a valve.

11. In a method of insulating a water heater having a water tank with a component intended to be kept substantially free from contact with an expandable foam insulating material, the steps comprising:
    (a) placing over a part of the tank surface a pair of flexible sheets forming an apron, the sheets being joined to form a seal protecting said component from contact with the foam, the apron being positioned on the tank whereby the seal surrounds said component, the apron being substantially unsealed along its top and sides;
    (b) securing a jacket around the tank and over the apron, the jacket being dimensioned to provide a space therebetween in which said apron is positioned;
    (c) introducing an expandable foam insulating material between the sheets, and
    (d) securing a cover on the top of the jacket to close off the top of the jacket, whereby the foam expands and flows out of the unsealed sides of the apron to fill said space.

12. The method according to claim 11, wherein the apron is composed of plastic.

13. The method according to claim 11, wherein the foam comprises polyurethane.

14. The method according to claim 11, wherein the component is a thermostat.

15. The method according to claim 11, wherein the component is a valve.

16. The method according to claim 11, wherein the heater is an electric water heater.

17. The method according to claim 11, wherein the sheets are joined along their bottom edges.

18. The method according to claim 11, wherein the pair of sheets comprises two portions of a single sheet.

19. The method according to claim 11, wherein the component comprises a drain opening.

20. The method according to claim 11, wherein the seal defines a closed shape which is cut out from the sheets.

* * * * *